INVENTORS E.I. GORDON
E.F. LABUDA
R.C. MILLER

BY R B Anderson
ATTORNEY

United States Patent Office

3,413,568
Patented Nov. 26, 1968

3,413,568
REVERSED AXIAL MAGNETIC FIELDS IN LASERS
Eugene I. Gordon, Convent Station, Edward F. Labuda, Madison, and Richard C. Miller, Summit, N.J., assignors to Bell Telephone Laboratories Incorporated, New York, N.Y., a corporation of New York
Filed June 22, 1965, Ser. No. 466,014
6 Claims. (Cl. 331—94.5)

This invention relates to gas lasers, and more particularly, to ion lasers.

The laser, also known as the optical maser, is a relatively recent development of far-reaching technological importance because of its ability to amplify light and to generate coherent oscillations at light frequencies. By a mechanism of selective excitation known as pumping, an abnormally high proportion of high energy states are produced within an active medium of the laser, establishing a condition known as population inversion. As particles in the high energy states decay to lower energy states, radiation is emitted in a small frequency range centered about a characteristic optical frequency. It is possible to stimulate emission of radiation at the characteristic frequency for amplifying light or for generating coherent light. As used herein, terms such as "light" and "optical frequency" are intended to denote not only the visible spectrum, but also the infra-red, ultra-violet, and such other frequencies that can be used with the laser techniques that are described.

In a conventional gas laser, the higher energy states involved in the population inversion of the laser are associated with excited states or neutral component atoms of a gas plasma which serves as the active medium. These atoms are excited by establishing a gas discharge in the gas medium; pumping results from collisions of the discharge electrons with neutral unexcited atoms. The gas discharge may be maintained by applying a radio-frequency electric field, or more typically, by a direct current between a cathode and an anode as in conventional gas discharge tubes. In either case, the gas discharge region is normally defined by an extended tubulation, the axis of which is coincident with the light beam to be generated or amplified. The desired laser action results from coherent radiation at a specific frequency by a large number of excited neutral atoms as they decay to a lower energy state. In an amplifier, the net decibel gain is normally proportional to the total length of the gas plasma through which the incident light propagates. In a laser oscillator, the available output power is an increasing function of the total plasma length through which the resultant light propagates.

New forms of gas lasers, generally known as ion lasers, are described in the copending applications of E. I. Gordon and E. F. Labuda, Ser. No. 385,159, filed July 27, 1964, and Ser. No. 439,657, filed Mar. 15, 1965, both of which are assigned to Bell Telephone Laboratories, Incorporated. As is pointed out in these applications, by using a much higher direct electrical current through the gas plasma than in conventional gas lasers, ions of the gas plasma, rather than neutral gas atoms, can be excited to a condition of population inversion. The ion laser has been found to be capable of generating a significantly higher output power and is capable of much higher gain than conventional gas lasers.

As is disclosed in the application Ser. No. 439,657, the gain and available output power of an ion laser can be further enhanced by increasing the charged particle density within the gas discharge region. It is further taught that the attainable charged particle densities in conventionally designed ion lasers are limited because of the potential damage to the tubular envelope under conditions of intense heat and particle bombardment. Under such conditions, the envelope tends to release contaminants which may seriously interfere with the operation of the gas discharge and impair the desired laser action.

It is an object of this invention to increase the gain and attainable output power of ion lasers.

This and other objects of the invention are attained in an ion laser of the general type described above. A cylindrical tubulation between a cathode and an anode defines a linear gas discharge path. A significantly higher continuous electrical current is transmitted through the discharge region than is true of conventional lasers in order to attain an appropriate population inversion of component ions. The cumulative coherent radiation of the excited ions at a characteristic wavelength or frequency results in the generation of a coherent light beam along the linear path. If the device is to be used as an amplifier, a light beam which is to be amplified and whose frequency is equal to the characteristic frequency is directed along the linear path.

As is described in the copending application of W. W. Rigrod, Ser. No. 465,927, filed at the same time as this and having a common assignee, improved results are achieved if a cylindrical magnet surrounds the linear tubulation and produces an axial magnetic field within the gas plasma. The axial magnetic field produces net forces on the charge particles of the gas discharge that are directed radially inwardly. As a result, the gas discharge is constricted, the axial voltage gradient is reduced, and the axial charged particle density for a given discharge current is increased. As was pointed out before, a higher charged particle density is an ion laser produces a higher optical gain and thus a higher available output power. In addition, the efficiency of the laser is increased because the reduction in the axial voltage gradient implies that a decrease in input power will accompany the increase in output power. Further, since a majority of the charge particles are constrained near the center of the discharge tube, bombardment destruction of the tube walls and resulting contamination of the discharge is substantially reduced. The constriction of the gas plasma also alleviates the problems of cooling the cylindrical tubulation.

As is known in the art, opposite ends of the tube envelope are usually closed by "Brewster angle" windows. In the absence of a magnetic field, the reflection loss of the window, for laser light of a given linear polarization, is vanishingly small. Only light having a properly oriented linear polarization can be transmitted through Brewster angle windows with a vanishingly small or zero reflection loss. However, because of an unavoidable phenomenon which will be referred to as Zeeman splitting, a laser discharge operating in a continuos axial magnetic field is in most cases incapable of generating a linearly polarized laser light beam. While the magnetic field of the Rigrod application has the advantages given above, it has the disadvantage of increasing window loss because of the effects of Zeeman splitting.

We have now found that these deleterious effects can be reduced or eliminated by appropriately reversing the direction of the magnetic field in the discharge region. In one embodiment of the invention, the direction of the axial magnetic field is reversed at the midpoint of the linear discharge region. The effects of Zeeman splitting in one direction along one portion of the discharge region are compensated for by similar effects in the opposite direction along the remainder of the discharge region, and the net deleterious effects are substantially eliminated. Precise compensation for the effects of Zeeman splitting requires that the optical decibel gain at a given frequency in a region of one axial magnetic field direction be equal to the optical decibel gain at the same given frequency in the remaining region of opposite magnetic field direction and that the phase shift at a given frequency in one region be equal to the phase shift at that frequency in the remaining region. Hence, the magnetic field may include several reversals, providing that the total optical decibel gain at a given frequency in the regions of one magnetic field direction is substantially equal to the total optical decibel gain in the regions of the opposite magnetic field direction, and that the sum of the phase shifts at a given frequency in one group of regions is equal to the phase shifts in the other group. Close approximation of these conditions can be made by merely locating the field reversals symmetrically along a uniform laser discharge.

In accordance with other features, the tube structure is modified for better tube coaction with the magnet and magnetic field. In one embodiment, flared envelope portions are included at the ends of the cylindrical tubulation to form magnetic field transition regions in which the discharge path enters and leaves the magnetic field. This reduces envelope bombardment in the region of magnetic fringing fields near the ends of the magnet structure surrounding the device. In another embodiment, the discharge is constrained to flow along the central axis by a single apertured disk within a large diameter envelope. The only discharge path from the cathode to the anode is through the central axial aperture in the disk; this inherently confines the entire linear discharge path to the central axis.

These and other objects and features of the invention will be better appreciated from a consideration of the following detailed description, taken in conjunction with the accompanying drawing, in which.

Figure 1:
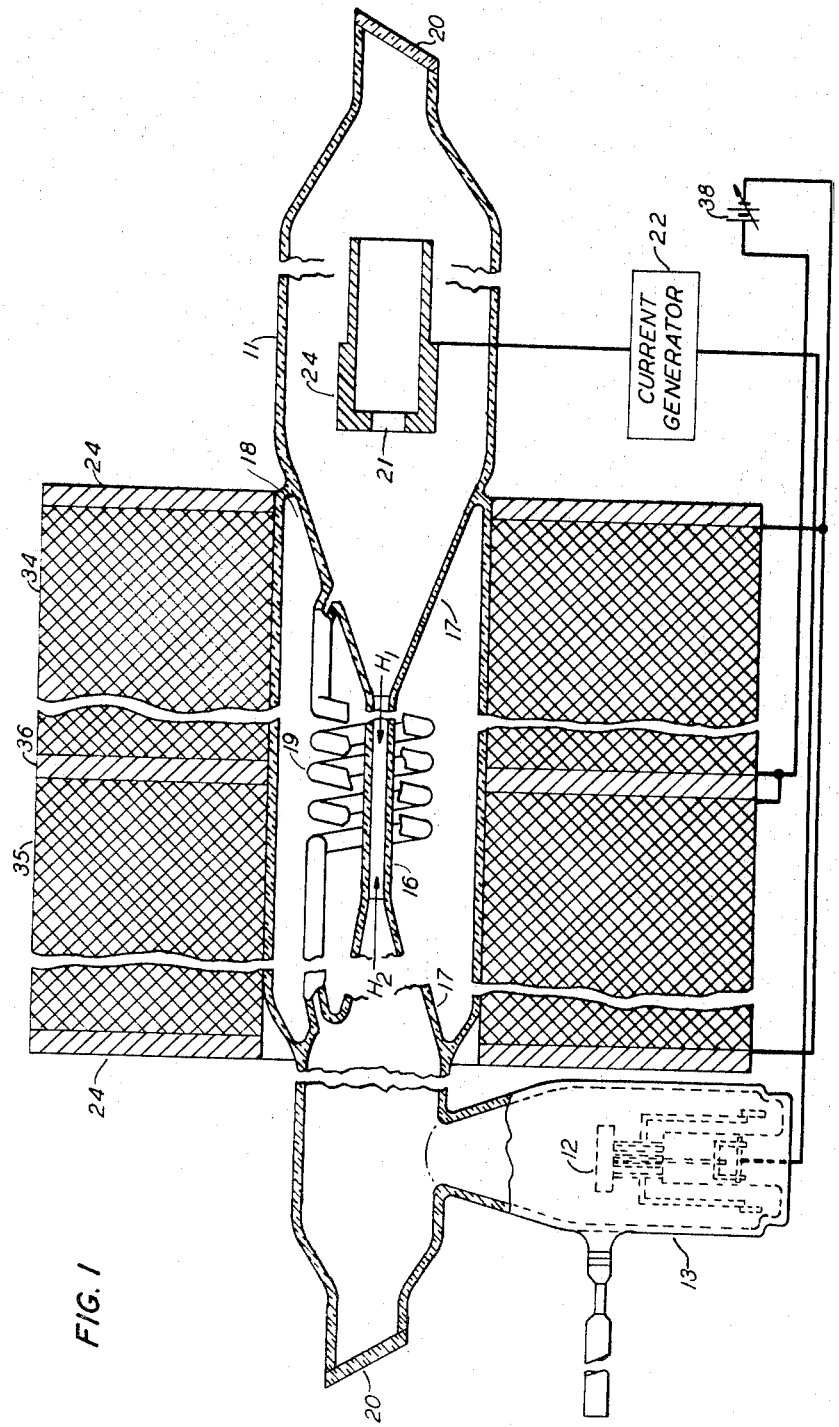
FIG. 1 is a sectional view of one embodiment of the invention.

Referring now to FIG. 1 there is shown a direct-current excited continuously operable ion laser comprising an envelope 11 for containing a gas. A cathode 12 is contained within an enclosure 13 which is attached to, and communicates with, the envelope 11. Contained within an enlarged portion at the opposite end of the envelope is an anode 14. The device is filled with an appropriate gas which is suitable for population inversion of component ions when a gas discharge of a sufficiently high current is maintained therethrough. Such a gas may, for example, be argon at a pressure of .45 millimeter of mercury. Other noble gases can alternatively be used, as is known in the art.

Extending between the cathode and anode is a tubular portion 16 of the envelope 11. Flared portions 17 of the envelope interconnect the tubular portions with enlarged end portions. A gas discharge may be established in a known manner between the cathode and the anode through the extended tubulation 16. Surrounding the tubulation 16 is a jacket 18 for transmitting a cooling medium such as water or air to remove heat from the tubulation 16. Contained within the jacket 18 is a helical gas-return tube 19 which communicates with opposite ends of the envelope to equalize the gas pressure within the device in accordance with the principles of the aforementioned copending application, Ser. No. 385,159. Located at opposite ends of the envelope 11 are light transparent windows 20 which intersect the central axis of the device and are tilted at an appropriate Brewster angle for maximizing light transmission therethrough in accordance with known principles. The anode 14 contains a central axial aperture 21 which permits light to be directed along the central axis of the device through the windows 20 and the tubular portion 16.

During operation, a relatively high current is generated by a current generator 22 which is transmitted along the gas discharge path from the cathode 12 along the central axis of tubulation 16, to the anode 14. This high current, which may, for example, be on the order of 10 to 100 amperes, causes a substantial part of the gas molecules or atoms within the device to become ionized. Additionally, the ions are excited to a condition of population inversion which is characterized by the existence of an abnormally high proportion of ions in a high unstable energy state. As these ions decay to lower energy states, they radiate light energy at a characteristic frequency, in accordance with known laser phenomena. As is known in the art, high frequency electric fields can alternatively be used for exciting the gas discharge in which case the anode and cathode can be eliminated.

When the device is used as an amplifier, light waves are admitted to the device through either of the windows and become amplified through the additive effect of stimulated emission from the excited gas ions. Mirrors may be placed on opposite sides of the device along the central axis in a known manner to form an optical cavity for multiplying the amplification or feeding back a sufficient portion of the energy to permit the device to operate as an oscillator. The mirrors may also be substituted for the windows in an internal mirror configuration.

It should be noted that by using a generally cylindrical anode 14 having a central axial aperture 21 for permitting passage of the light beam, the anode can be included within the envelope 11, without the necessity of a separate anode enclosure of the type which encloses the cathode 12. This also permits the gas return tubulation 19 to surround the central tubulation 16 which makes the device more compact and rugged.

Surrounding the jacket 18 is a cylindrical magnet 23 for forming axial magnetic fields $H_1$ and $H_2$ within the elongated central tubulation 16. The purpose of the magnetic fields is to establish a magnetic pressure on the charged particles of the gas discharge, and thereby constrict the gas discharge within the central tubulation 16. This effectively removes the gas discharge from the inner walls of the tubulation 16 and thereby reduces or eliminates deleterious particle bombardment of the tube walls. Perhaps more importantly, the magnetic field increases the axial charged particle density of the discharge within the linear tubulation 16. It can be shown that the optical gain and therefore the available output power of an ion laser increases rapidly with increases in the charged particle density.

As is explained in the Rigrod application, axial magnetic fields have not been used, as far as we know, for increasing the axial charged particle density within conventional gas discharge devices. As is known, charged particles in a magnetic field tend to gyrate in orbits around the magnetic field lines. If the mean free path of an electron within a gas discharge is smaller than the orbital circumference of the electrons, the magnetic field will not necessarily constrict the discharge. Orbital circumference here refers to distance travelled during one revolution. The mean free path is the average distance through which a charged particle will move before colliding with another particle. If the gas pressure is high enough to give a small electron mean free path with respect to its orbital circumference, the motion of the charged particles with respect to the magnetic field will be random due to repeated particle collisions, and net inward radial forces on the particles will be considerably reduced. However, in an ion laser of the type shown in FIG. 1, the gas pressures, which are typically less than 1 millimeter of mercury, result in an electron mean free path which is substantially longer than the electron orbital circumference, which necessarily results in constriction of the discharge and enhancement of the charged particle density in accordance with the invention.

Located on opposite ends of the magnet 23 are conventional annular pole pieces 24. It is preferred that the magnetic field within the tubulation 16 be substantially uniform, and that fringing fields do not extend into the tubulation 16. For this reason, the ends of the cylindrical tubulation 16 are displaced from the pole pieces 24 an axial distance which is preferably greater than the inside diameter of the central apertures of the pole pieces. Under these conditions, the magnetic fringing fields will be substantially limited to the regions defined by the flared portions 17 of the envelope. The change of diameter of the flared portions 17 is roughly proportional to the change of magnetic intensity due to the fringing fields, so that the cross-sectional area of the discharge may gradually expand in these regions without impinging on the envelope.

One disadvantage of the device described in the aforementioned Rigrod application has been the observation that a continuous axial magnetic field affects the polarization of the light beam so as to increase transmission losses at the Brewster angle windows. As is well known, Brewster angle windows are used in lasers because they have a vanishingly small reflection loss with respect to laser light of a given linear polarization. However, when the laser discharge is placed in a continuous axial magnetic field, the Doppler broadened gain versus frequency profile of the laser is split into several components; this phenomenon is referred to as Zeeman splitting. One group of the split components interacts with light having right-hand circular polarization while the other group interacts with left-hand circularly polarized light. As a result, a linearly polarized light beam which has lossless transmission through the Brewster angle windows cannot ordinarily be established, and when an optical cavity is used for operation of the laser as an oscillator, the laser cavity cannot support linearly polarized modes. Instead, the modes are elliptically polarized with the major axis of the ellipse oriented nearly parallel to the linear polarization direction for which the window loss is zero. Light of this polarization may experience a significant reflection loss at the Brewster angle windows. Further, the capacity to use Brewster angle prisms in the cavity to obtain oscillations on only one wavelength of a number of possible wavelengths is or may be seriously compromised.

One way of reducing reflection losses is to use antireflection coated windows that are disposed normal to the discharge axis, rather than being tilted at a Brewster angle. One disadvantage of this scheme is that the antireflection coatings tend to deteriorate when exposed to the gas discharge environment. Another is that the polarization of the output beam is often not very well defined.

In the device of FIG. 1, the effects of Zeeman splitting are reduced or eliminated by reversing the direction of the axial magnetic field at the midpoint of the discharge region. This can conveniently be done by conducting current in one direction through a coil 34 of the electromagnet, and in an opposite direction through a coil 35 of the magnet, as is shown by the connections of the coils to a voltage source 38. This will result in oppositely directed magnetic fields $H_1$ and $H_2$ in the regions enclosed by the two coils 34 and 35. An annular pole piece 36 is included between the two coils 34 and 35, for giving a relatively rapid transition between the magnetic fields $H_1$ and $H_2$.

The field reversal does not eliminate Zeeman splitting as such. However, the sense of circular polarization with which each of the groups of split components interacts is dependent on the direction of the magnetic field. For example, if a given group of components interacts with left-hand circularly polarized light in a magnetic field of one direction, it will interact with right-hand circularly polarized light in a magnetic field of the opposite direction. If the optical decibel gain and optical phase shift at a given frequency in the two oppositely directed magnetic field regions are substantially equal, the interaction with right- and left-hand circularly polarized components will be substantially equal. This will result in a net linearly polarized component which is suitable for lossless transmission through the Brewster angle windows. Magnetic fields for constricting the discharge can therefore be used in conjunction with Brewster angle windows 21 without thereby increasing reflection losses.

As explained in the Rigrod application, optical gain in the laser can be optimized by adjusting the magnetic field intensity. Accordingly, voltage source 38 is preferably variable as shown in FIG. 1, so that the current through the electromagnet can be adjusted for attaining the optimum field intensity. Note that the current through both coils 34 and 35 is adjustable by the variable voltage source.

Figure 2:
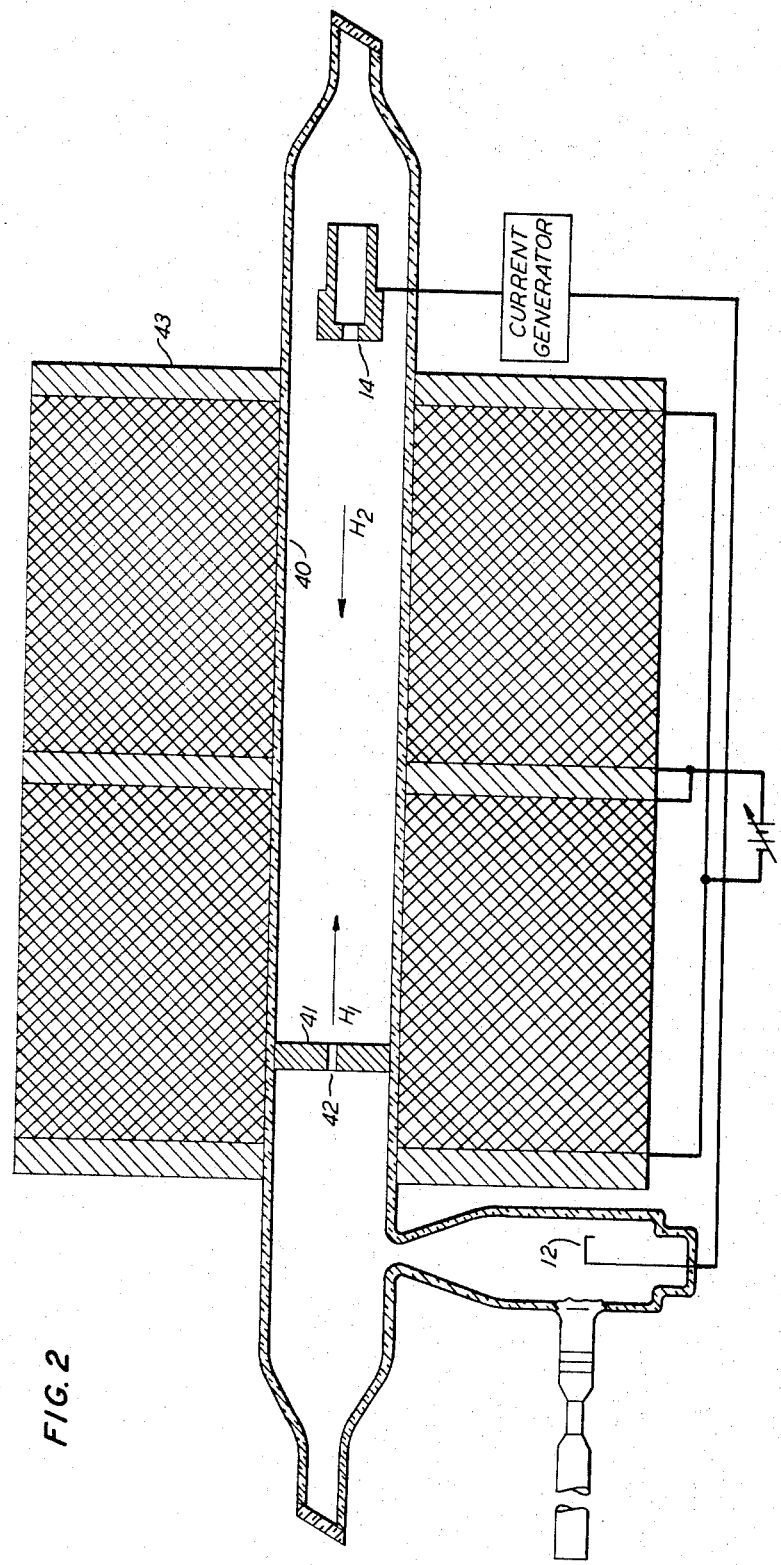
FIG. 2 is a sectional view of another embodiment.

If the central envelope tubulation has a very large bore diameter, say of more than several centimeters, and in the absence of any other modification, the discharge may not be constricted along the central axis of the device, but part or all of the discharge may follow an off-axis path. Referring now to the embodiment of FIG. 2, an ion laser is shown having an envelope 40 of large inside diameter along its entire length. The discharge is constrained to follow an axial path by a metal disk 41 having an axial central aperture 42. Since the aperture 42 provides the only discharge path from the cathode 12 to the anode 14, an axial discharge path is assured. As was taught in the above-mentioned application Serial No. 439,657, metal disks such as disk 41 should be sufficiently thin to avoid undue perturbation of the electric field gradient along the central axis. Also, it should be made of non-magnetic material so that it does not disturb the magnetic field. As before, the discharge is constricted by magnetic fields produced by an electromagnet 43.

From the foregoing, it is clear that numerous magnetic field reversals could be used in the linear discharge region if so desired. For cancellation of the effects of Zeeman splitting, the summations of the decibel optical gains and phase shifts at a given frequency in the regions of one magnetic field direction should be respectively substantially equal to the summations of the decibel optical gains and phase shifts in the regions of opposite magnetic field direction. This condition can be stated in equation form as $$\Sigma G_1 \cong \Sigma G_2 \quad (1)$$
$$\Sigma \varphi_1 \cong \Sigma \varphi_2 \quad (2)$$

where $G_{(1, 2)}$ is the decibel optical gain at a given frequency, $\varphi_{(1, 2)}$ is the optical phase shift at a given frequency, and the subscripts (1, 2) refer to the two regions of opposite field direction. Since optical gain is a function of magnetic field intensity and tube diameter, among others, this implies that compensation for variations of such parameters as tube diameter can be made by variations of magnetic field intensity. It is believed, however, that practical embodiments of our invention can be best made by using magnetic field reversals that are symmetrically disposed along a discharge of generally constant optical gain and phase shift. This implies an odd number of field reversals forming field regions of equal length with equal field intensities in all of the regions.

The use of numerous field reversals may be particularly advantageous if permanent magnets are used to establish the magnetic fields because, as is known, such reversals can reduce the weight of the magnet required for giving the desired field intensities. A large multiplicity of reversals can be used in either of the described embodiments. Although continuous wave devices have been described, the invention can also be used in pulsed lasers. Various other modifications and embodiments may be made by those skilled in the art without departing from the spirit and scope of the invention.

What is claimed is:
1. An ion laser comprising:
an envelope having a central axis and being filled with a quantity of gas which is capable of population inversion in an ionized condition;
means for establishing a gas discharge through the gas;
means for maintaining a sufficiently high current through the gas discharge to ionize a significant portion of the gas and to establish a population inversion of component ions, thereby initiating the stimulated emission of coherent optical radiation from at least part of the component ions of the gas;

means for increasing the optical gain of the laser comprising means for forming through the discharge an axial magnetic field;

and means for reversing the axial direction of the magnetic field at substantially the longitudinal midpoint of the gas discharge, thereby reducing the effects of Zeeman splitting in the gas discharge region.

2. A laser comprising:

an envelope having a central axis and being filled with a quantity of gas which is capable of population inversion;

means for establishing a gas discharge through said gas;

means for maintaining a sufficiently high current flow through said gas to establish a population inversion of component particles, thereby initiating the stimulated emission of coherent optical radiation from at least part of the component particles;

opposite ends of the envelope defining Brewster angle windows, whereby light energy may efficiently be transmitted therethrough;

means for confining a major portion of the gas discharge to a region that is coincident with the central axis;

and means for increasing the charge particle density along the major portion of the gas discharge comprising means for forming an axial magnetic field along the major portion of the gas discharge;

the magnetic field along substantially one-half of the major portion of the gas discharge extending in a direction that is opposite to the magnetic field in the other half of the major portion.

3. An ion laser comprising:

an envelope being filled with a quantity of gas which is capable of population inversion in an ionized condition;

means for establishing a gas discharge within the envelope along a central axis;

means for maintaining a sufficiently high current flow through the gas discharge to ionize a significant portion of the gas and to establish a population inversion of component ions, thereby establishing a condition of optical gain along the linear gas discharge path;

and means for producing axial magnetic fields along the linear discharge path which are directed in a first axial direction along parts of the path and in an opposite axial direction along the rest of the path;

the optical decibel gain and phase shift at a given frequency along the portions of the path in which the magnetic field is directed in one axial direction being substantially equal to the optical decibel gain and phase shift along the remaining portions of the path along which the magnetic field is directed in the opposite direction.

4. An ion laser comprising:

an envelope being filled with a quantity of gas that is capable of population inversion in an ionized condition;

means for establishing a gas discharge within the envelope along a central axis;

Brewster angle windows on opposite ends of the envelope intersecting the central axis;

means for maintaining a sufficiently high current through the gas discharge to ionize a significant portion of the gas and to establish a population inversion of component ions, thereby establishing a condition of optical gain along the linear gas discharge path;

and means for producing along the linear discharge path first axial magnetic fields which are directed in one axial direction along parts of the path and second axial magnetic fields which are directed in an opposite axial direction along the remainder of the path;

the total decibel optical gain at a given frequency in the regions of the first magnetic field being substantially equal to the total decibel optical gain in the regions of the second magnetic field;

and the total optical phase shift at a given frequency in the regions of the first magnetic field being substantially equal to the total phase shifts in the regions of the second magnetic field.

5. A gas discharge device comprising:

an envelope being filled with a quantity of gas;

said envelope having an elongated cylindrical portion of small diameter, end portions of large diameter, and flared portions interconnecting the small and large diameter portions;

means comprising a cathode near one end of the envelope and an anode near the other end of the envelope for establishing a gas discharge through the small diameter cylindrical portion;

means comprising a hollow magnet surrounding the cylindrical portion for constricting the gas discharge therein, thereby increasing the charged particle density of the discharge:

said magnet extending beyond the ends of the cylindrical portion a distance further than the inner diameter of the hollow magnet, whereby magnetic fringing fields within the envelope are substantially restricted to the flared portions thereof and do not extend into the small diameter cylindrical portion.

6. An ion laser comprising:

a tubular envelope having a central axis and being filled with a quantity of gas which is capable of population inversion in an ionized condition;

means for establishing a gas discharge comprising an anode and a cathode near opposite ends of the envelope;

Brewster angle windows on opposite ends of the envelope intersecting the central axis;

means for maintaining a sufficiently high current through the gas discharge to ionize a significant portion of the gas and to establish a population inversion of component ions, thereby establishing a condition of optical gain along the linear discharge path;

the anode comprising a substantially cylindrical member coaxial with the central axis and having a central aperture for permitting the transmission of an axial light beam therethrough;

means for producing along the discharge path first axial magnetic fields which are directed in a first axial direction along part of the path and second axial magnetic fields which are directed in an opposite direction along the remainder of the path;

the total values of the optical gains G and phase shifts $\varphi$ at a given frequency along the discharge being substantially defined by $$\Sigma G_1 \cong \Sigma G_2$$
$$\Sigma \varphi_1 \cong \Sigma \varphi_2$$

where the subscripts 1, 2 refer respectively to the regions of the first and second magnetic fields.

References Cited

Gerritsen et al.: "Laser Induction Pumping," RCA Technical Notes, No. 606, March, 1965.

JEWELL H. PEDERSEN, *Primary Examiner.*

E. S. BAUER, *Assistant Examiner.*